(No Model.)
F. A. NEIDER & G. GROSSMANN.
DETACHABLE HANDLE FOR UTENSILS.
No. 258,591. Patented May 30, 1882.
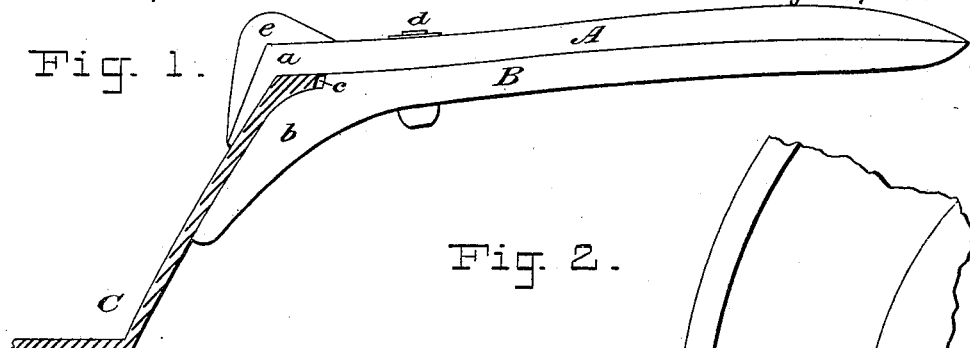
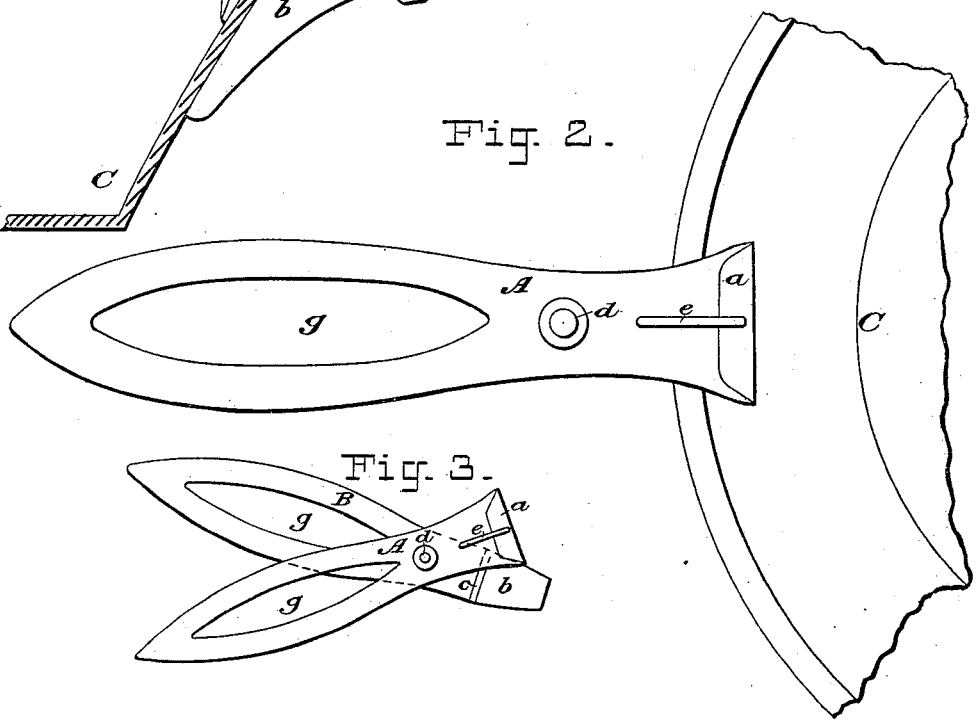
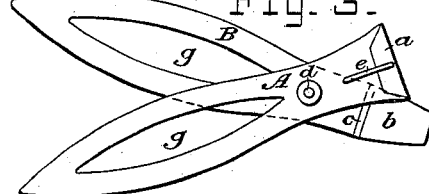
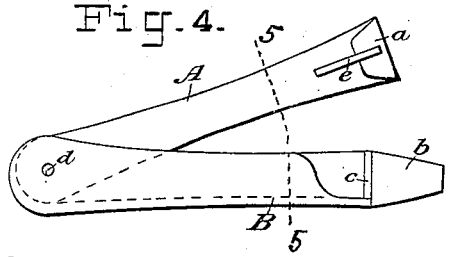
WITNESSES:
INVENTORS:
Fred A. Neider & Geo. Grossmann
by their Attorneys
Burke, Fraser & Connell

UNITED STATES PATENT OFFICE.

FRED A. NEIDER AND GEORGE GROSSMANN, OF AUGUSTA, KENTUCKY.

DETACHABLE HANDLE FOR UTENSILS.

SPECIFICATION forming part of Letters Patent No. 258,591, dated May 30, 1882.

Application filed February 28, 1882. (No model.)

*To all whom it may concern:*

Be it known that we, FRED A. NEIDER and GEORGE GROSSMANN, both citizens of the United States, and residents of Augusta, Bracken county, Kentucky, have jointly invented certain Improvements in Detachable Handles for Utensils, of which the following is a specification.

This invention relates to a readily-detachable handle for utensils, being especially adapted to cast-iron and tin vessels for culinary purposes. Ordinarily such utensils have a handle cast on or permanently affixed thereto, and these interfere with the close packing or nesting of the utensils for storage and shipment. The handle, when fixed permanently to the utensil, also interferes at times with the proper setting of the vessel in or on the stove or range, and becomes so hot as to cause the cook great annoyance.

We are aware that detachable handles or holders have been proposed for utensils; but these, so far as we are aware, differ materially from our handle herein described.

The novel features of our invention will be set forth in the claims.

In the drawings, which serve to illustrate our invention, Figure 1 is a side elevation of our improved detachable handle shown as temporarily attached to a utensil. Fig. 2 is a plan of the same. Fig. 3 is a plan on a smaller scale, showing the handle detached and the jaws slightly separated. Figs. 4 and 5 show the parts of the handle arranged to close one into the other.

The handle is composed of two elements or parts, A and B, the former of which is provided with a hooked jaw, *a*, which takes over the rim of the utensil C, and the latter is provided with a hooked jaw, *b*, which takes under and against the rim of the utensil on the outside. This latter jaw has a suitable recess, *c*, formed in it to receive the flange on the utensil.

The two parts A and B are secured together by a vertically-arranged rivet, screw, or other connection, *d*, whereby the parts A B may be turned at an angle to each other somewhat in the manner of a pair of shears and as illustrated in Fig. 3.

When it is desired to attach the handle to the utensil the parts A and B are turned so as to stand at an angle to each other, the jaw *a* is placed over the rim of the utensil, as in Fig. 1, and the other jaw, *b*, turned until it takes under the rim of the utensil by bringing the parts A and B into position one over the other, as shown in Figs. 1 and 2. The utensil will then be firmly grasped by the jaws, and may be lifted and handled quite as well as if the handle were permanently attached to it.

The handle may be attached to the rim of the utensil at any point desired.

The jaw *a* may be provided with a strengthening-rib, *e*, and the parts A and B with apertures *g g*, by which the handle can be conveniently hung up.

We contemplate constructing these handles of different sizes and with jaws, if necessary, of different forms to suit utensils of different kinds; and we also contemplate the manufacture and sale of handles separately from the utensils. Indeed, one handle may serve for several utensils; or it may be attached by the user to a utensil and permitted to remain attached as long as desired.

It will be observed that when the jaws are clamped on the rim of the utensil the jaws lie one over the other, and the parts through which the pivot passes also lie one over the other, the pivot standing vertical. The jaws, as they come together in clamping, move in planes substantially parallel to their clamping-faces and in different planes, instead of toward each other and in the same plane, as in the case with other handles or holders.

In our improved handle it will be seen that the weight of the utensil is not exerted to spread the jaws. The handle must be released by a special effort exerted laterally in a way to separate the two jaws. In this our handle differs from all others, so far as we are aware, they having the pivot so arranged with reference to the clamping-jaws that the weight of the utensil, when it is lifted, tends to pry open the jaws.

The jaw *b* of the handle may serve as a stove-lid lifter, as desired.

Fig. 3 is a plan, and Fig. 4 a cross-section, of another modification of the detachable handle, in which the rivet $d$ is arranged at the end of the handle and the part A closes into a hollow in the part B as a blade of a penknife closes into its handle.

The cross-section Fig. 5 is taken on the line 5 5 in Fig. 4. The part B is formed with a recess or pocket, as indicated, into which the part A fits when the two are closed together, so as to form a smooth rounded handle. To permit the jaw $a$ to move into its place over jaw $b$, the upper part of the part B is cut away, as shown in Fig. 4.

Having thus described our invention, we claim—

1. A detachable handle constructed substantially as described—that is to say, constructed of two parts pivoted together, and provided with jaws arranged to move in closing in planes substantially parallel to their faces, as set forth.

2. The combination, to form a detachable handle for utensils, of the two parts pivoted together and provided with jaws to grasp the utensil, arranged to move in closing in planes substantially parallel to their faces, and one part arranged to close within a pocket in the other when the two are brought together, substantially as set forth.

In witness whereof we have hereunto signed our names in the presence of two subscribing witnesses.

FRED A. NEIDER.
GEORGE GROSSMANN.

Witnesses:
GEO. L. BRADFORD,
W. J. IRWIN.